United States Patent
Ketelaar et al.

(10) Patent No.: US 8,448,346 B2
(45) Date of Patent: May 28, 2013

(54) TRIGGER ASSEMBLY FOR PARTS CHECKING JIGS AND THE LIKE

(75) Inventors: Daniel J. Ketelaar, Sand Lake, MI (US); David L. Schuiling, Belmont, MI (US); Thomas K. Nagle, Grand Rapids, MI (US)

(73) Assignee: United Fastener & Supply LLC, Walker, MI (US)

( * ) Notice: Subject to any disclaimer, the term of this patent is extended or adjusted under 35 U.S.C. 154(b) by 115 days.

(21) Appl. No.: 13/252,310

(22) Filed: Oct. 4, 2011

(65) Prior Publication Data

US 2012/0084991 A1 Apr. 12, 2012

Related U.S. Application Data

(60) Provisional application No. 61/390,296, filed on Oct. 6, 2010.

(51) Int. Cl.
*G01B 3/00* (2006.01)
(52) U.S. Cl.
USPC .............................. 33/549; 33/832
(58) Field of Classification Search
USPC ............ 33/549, 545, 546, 551, 552, 832, 33/501.05, 613, 626, 655
See application file for complete search history.

(56) References Cited

U.S. PATENT DOCUMENTS

| | | | |
|---|---|---|---|
| 4,409,737 A | 10/1983 | Golinelli | |
| 4,554,747 A * | 11/1985 | Williams | 33/553 |
| 5,408,755 A | 4/1995 | Russell | |
| 5,901,455 A * | 5/1999 | Leitenberger et al. | 33/503 |
| 6,119,359 A * | 9/2000 | Suzuki et al. | 33/832 |
| 6,138,374 A * | 10/2000 | Friedersdorf et al. | 33/834 |
| 6,148,532 A * | 11/2000 | Ellis | 33/533 |
| 6,226,883 B1 | 5/2001 | Golinelli | |
| 6,269,546 B1 * | 8/2001 | Ventura | 33/645 |
| RE37,695 E * | 5/2002 | Leitenberger et al. | 33/503 |
| 6,389,867 B2 | 5/2002 | Golinelli | |
| 6,546,642 B1 | 4/2003 | Dall'Aglio et al. | |
| 6,920,698 B2 * | 7/2005 | Dall'Aglio et al. | 33/551 |
| 6,996,913 B2 * | 2/2006 | Lum et al. | 33/550 |
| 7,076,882 B2 | 7/2006 | Dall'Aglio et al. | |
| 7,204,033 B2 | 4/2007 | Mies | |
| 7,266,900 B2 | 9/2007 | Dall'Aglio et al. | |
| 7,726,035 B2 * | 6/2010 | Chang et al. | 33/551 |
| 7,748,133 B2 * | 7/2010 | Liu | 33/549 |
| 7,841,102 B2 * | 11/2010 | Xiao et al. | 33/832 |
| 2009/0094851 A1* | 4/2009 | Xiao et al. | 33/832 |
| 2009/0300932 A1* | 12/2009 | Liu | 33/832 |
| 2012/0084991 A1* | 4/2012 | Ketelaar et al. | 33/549 |

* cited by examiner

*Primary Examiner* — Yaritza Guadalupe-McCall
(74) *Attorney, Agent, or Firm* — Price Heneveld LLP

(57) ABSTRACT

A trigger assembly for parts checking jigs and the like has a pivoting trigger arm with a central bearing aperture. A universal base is supported on the jig, and has two pairs of pivot pin apertures located adjacent opposite ends, a U-shaped central channel in the bottom face in which the trigger arm is received, and two laterally spaced gauge bushing apertures in the upper face. A pivot pin extends through the bearing aperture in the trigger arm and one pair of the pivot pin apertures in the base. A spring is mounted in the base and biases the trigger arm to an extended position. A gauge bushing is received in one of the two bushing apertures, such that the trigger arm assembly can be readily reconfigured for placement at various locations on the jig by selective mounting of the trigger arm and the gauge bushing in selected ones of the associated base apertures.

18 Claims, 6 Drawing Sheets

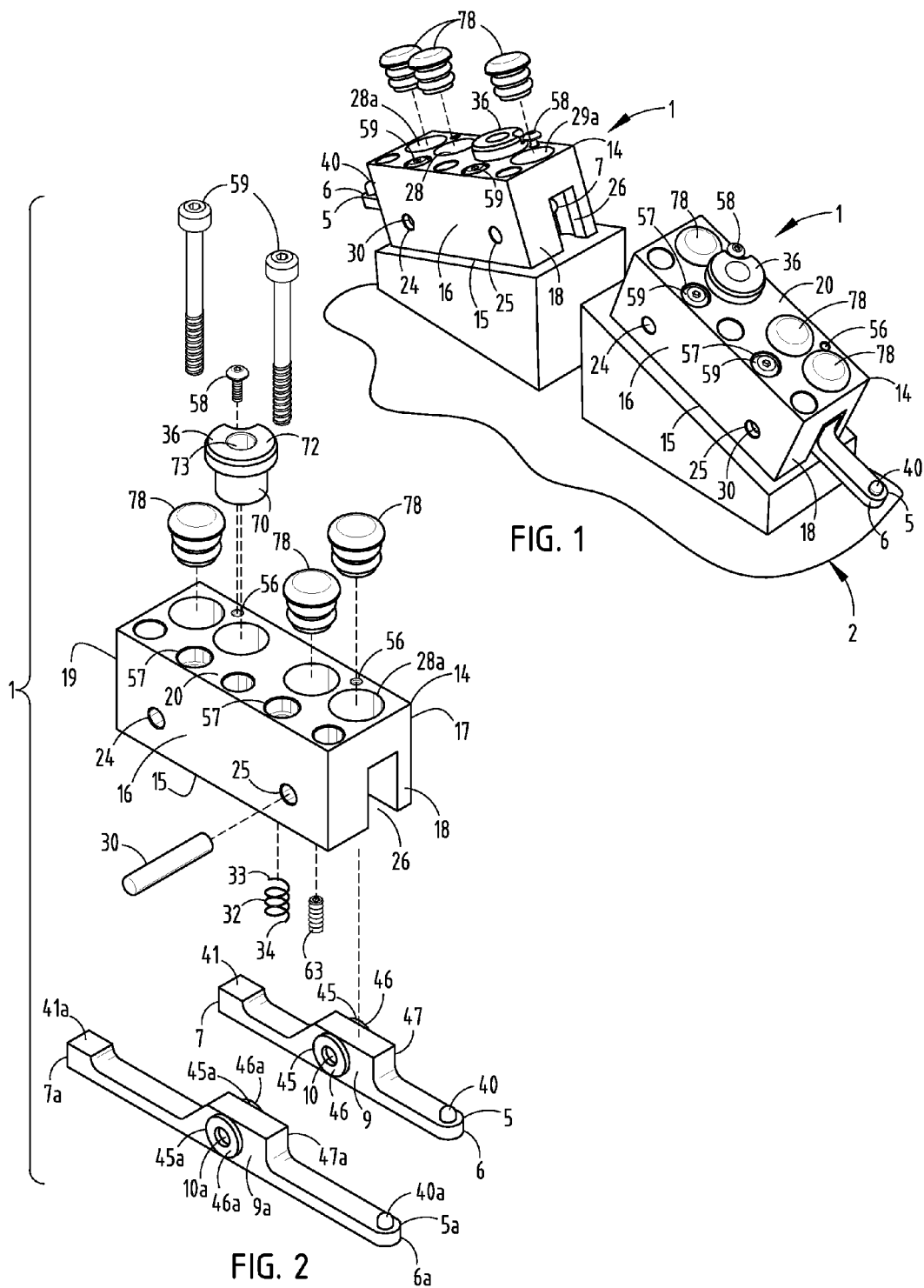

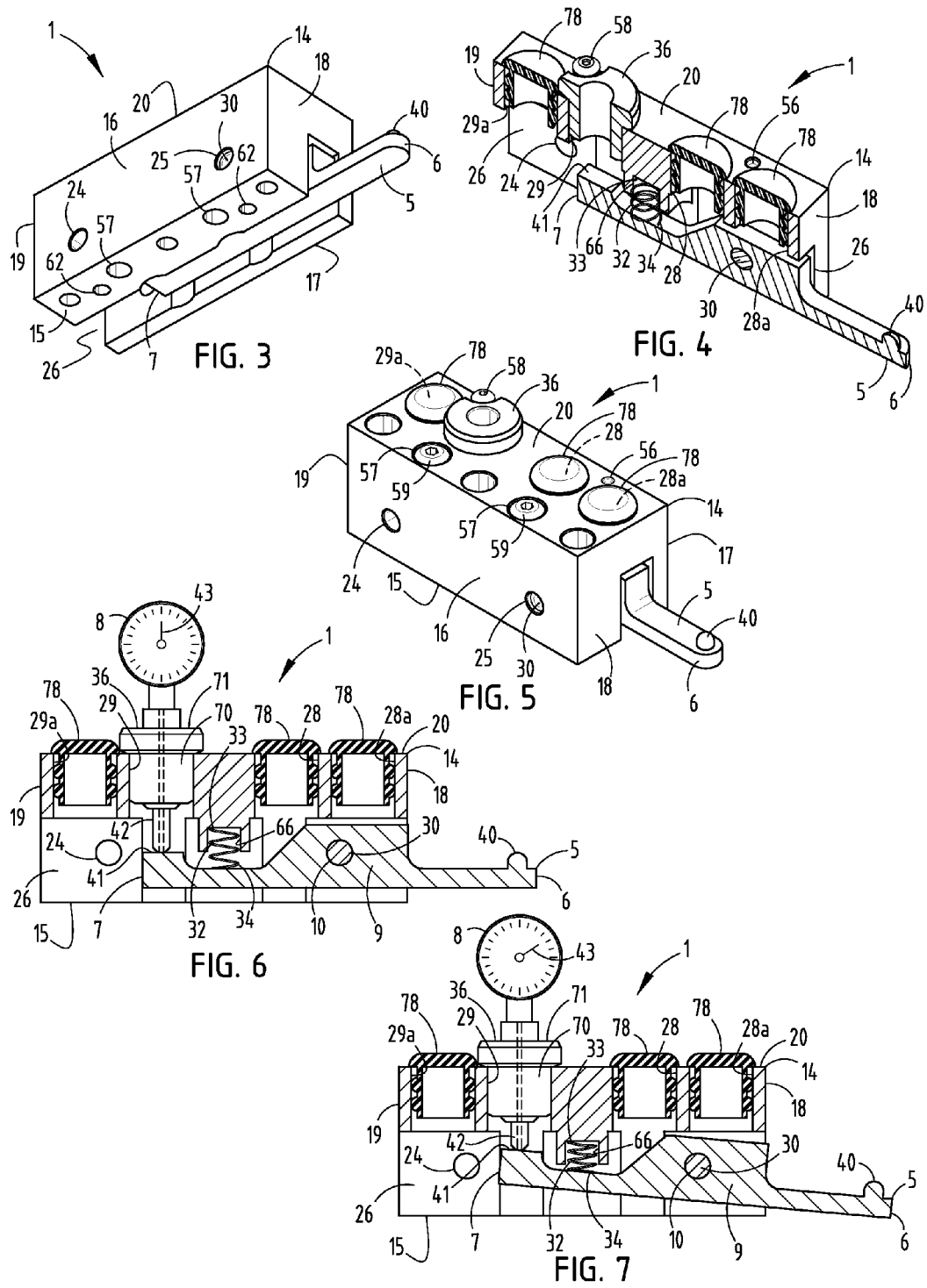

TRIGGER ASSEMBLY FOR PARTS CHECKING JIGS AND THE LIKE

CROSS REFERENCE TO RELATED APPLICATION

This application claims priority to U.S. Provisional Patent Application No. 61/390,296 filed on Oct. 6, 2010 entitled TRIGGER ASSEMBLY FOR PARTS CHECKING JIGS AND METHOD.

BACKGROUND OF THE INVENTION

The present invention relates to parts checking jigs and the like, and in particular to a trigger assembly therefor.

Jigs are typically used to dimensionally check sheet metal parts, assemblies, and the like to ensure that they conform with design specifications. A plurality of trigger assemblies are typically positioned at the critical dimension points around the jig. Each trigger assembly normally includes a pivoting trigger arm having an outer end that abuts an adjacent portion of an associated formed sheet metal part to be checked, and an inner end configured to abut an associated checking gauge or dial indicator, which displays the precise position of the pivot trigger arm, so as to determine the exact shape and position of the sheet metal part in the jig.

Heretofore, each trigger assembly had a single purpose design, with one permanent or fixed pivot arm location, and one permanent or fixed gauge bushing location. The various parts of these prior art trigger assemblies were press fit together, and could not be easily disassembled, nor could the assembly be readily reconfigured. Furthermore, prior trigger assemblies were permanently preassembled with either a long pivot arm or a short pivot aim, and were therefore capable of use only at limited locations within the jig. Consequently, a plurality of differently shaped trigger assemblies, with different length trigger arms and differently positioned gauge bushings, were required for a single jig, which results in increased manufacturing costs, and substantial costs associated with inventorying a large number of different trigger assemblies.

SUMMARY OF THE INVENTION

One aspect of the present invention is a trigger assembly for parts checking jigs and the like, including a pivoting trigger arm having an outer end portion configured for abutting contact with a formed part disposed in an associated checking jig, an inner end portion configured for abutting contact with a gauge that indicates the position of the formed part relative to the checking jig, and a central portion with a laterally extending bearing aperture about which the trigger arm pivots. A universal base has a lower face configured for abutting support on an associated portion of the checking jig, opposite side faces, opposite end faces and an upper face disposed generally parallel with and opposite the lower face. First and second pivot pin apertures are disposed in the side faces of the base and arranged in a longitudinally spaced apart relationship adjacent the opposite end faces, and extend laterally through the side faces for selective alignment with the bearing aperture in the trigger arm. A generally U-shaped channel extends along the lower face of the base through the end faces, and is configured to receive and retain the trigger arm for pivotal motion in the U-shaped channel. First and second gauge bushing apertures are disposed in the upper face of the base and arranged in a longitudinally spaced apart relationship adjacent the opposite end faces, and extend through the upper face and into the U-shaped channel at locations generally overlying the trigger arm to facilitate the abutting contact between the gauge and the inner end portion of the trigger arm. A pivot pin is shaped for close reception in the bearing aperture of the trigger arm and both of the first and second pivot pin apertures in the base. The pivot pin is selectively received in one of the first and second pivot arm apertures and supports the trigger arm in the U-shaped channel of the base adjacent an associated one of the end faces of the base for pivoting motion between extended and retracted positions. A spring has an inner end portion supported in the base, and an outer end portion abuttingly contacting the trigger arm at a location thereon between the bearing aperture and the inner end to bias the trigger arm toward the extended position. A gauge bushing is shaped for close reception in both of the first and second gauge bushing apertures in the base. The gauge bushing is selectively received in one of the first and second bushing apertures for positioning the gauge adjacent an associated one of the end faces of the base, whereby the trigger arm assembly can be readily reconfigured for placement at various locations on the checking jig by selective mounting of the trigger arm using the pivot pin in either one of the first and second pivot pin apertures, and selective mounting of the gauge bushing in either one of the first and second gauge bushing apertures.

Another aspect of the present invention is to provide a reconfigurable, universal trigger assembly for parts checking jigs and the like, which can be easily adapted to permit positioning the same at different locations in the jig, so as to minimize production and inventory cost.

Yet another aspect of the present invention is a trigger assembly for parts checking jigs and the like that is economical to manufacture, efficient in use, and particularly well adapted for the proposed use.

These and other advantages of the present invention will be further understood and appreciated by those skilled in the art by reference to the following written specification, claims, and appended drawings.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a perspective view of two trigger assemblies embodying the present invention, shown mounted in a parts checking jig.

FIG. 2 is an exploded perspective view of one of the trigger assemblies shown in FIG. 1.

FIG. 3 is a bottom perspective view of the trigger assembly.

FIG. 4 is a longitudinal cross-sectional view of the trigger assembly.

FIG. 5 is a top perspective view of the trigger assembly.

FIG. 6 is a longitudinal cross-sectional view of the trigger assembly of FIGS. 1-5 with a gauge mounted therein, shown in an extended position.

FIG. 7 is a longitudinal cross-sectional view of the trigger assembly of FIGS. 1-5 with a gauge mounted therein, shown in a retracted position.

DETAILED DESCRIPTION OF THE PREFERRED EMBODIMENTS

Figure 8:
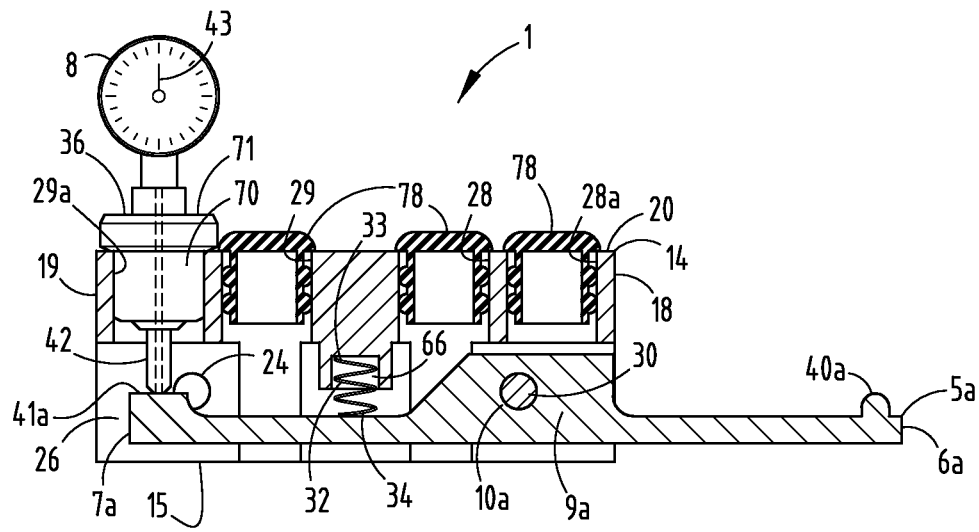
FIG. 8 is a longitudinal cross-sectional view of another embodiment of the present invention having a long trigger arm and with a gauge mounted therein, shown in an extended position.
Figure 9:
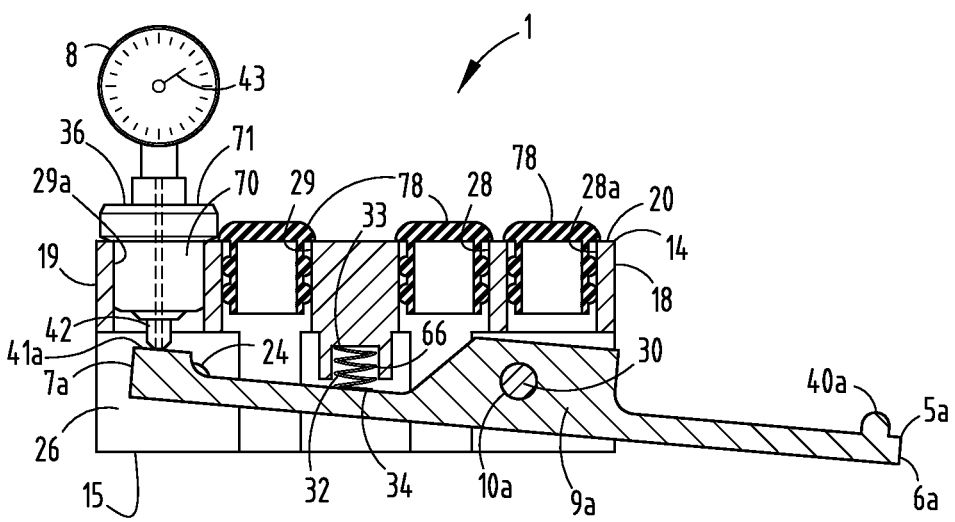
FIG. 9 is a longitudinal cross-sectional view of the second embodiment of the present invention of FIG. 8, having a long trigger arm and with a gauge mounted therein, and shown in a retracted position.
Figure 10:
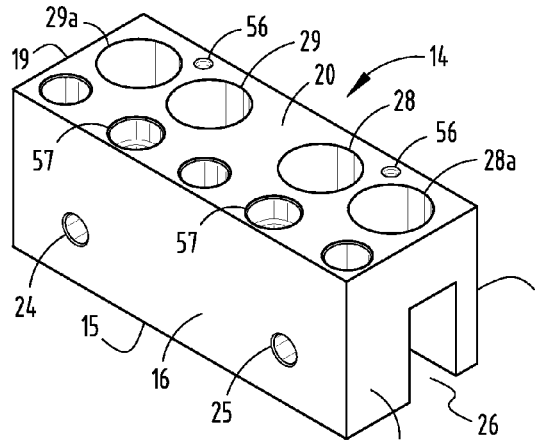
FIG. 10 is a perspective view of a universal base portion of the trigger assembly.
Figure 11:
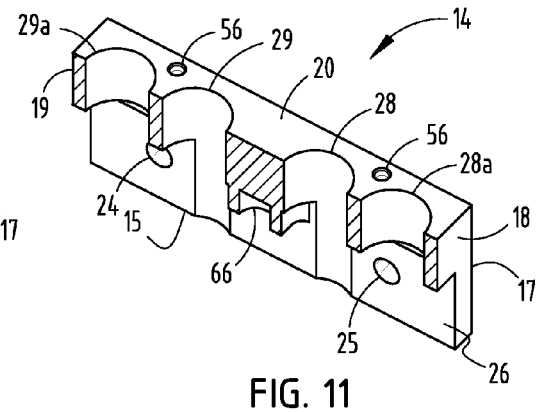
FIG. 11 is a longitudinal cross-sectional view of the universal base.
Figure 12:
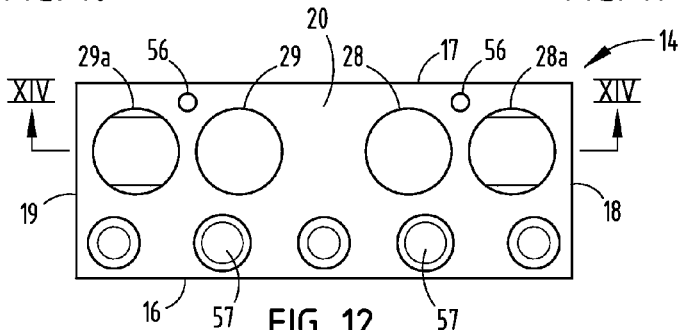
FIG. 12 is a top plan view of the universal base.
Figures 13, 14, 15:
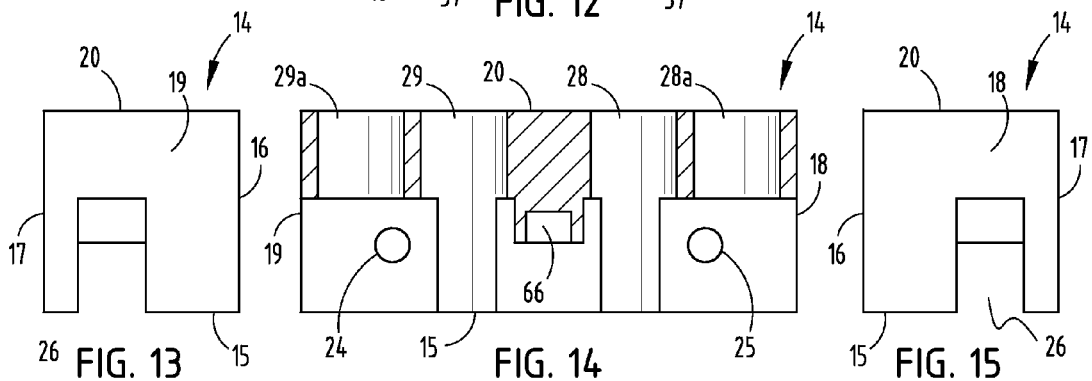
FIG. 13 is a left hand end elevational view of the universal base.
FIG. 14 is a longitudinal cross-sectional view of the universal base, taken along the line IVX-IVX, FIG. 12.
FIG. 15 is a right hand end elevational view of the universal base.
Figure 16:
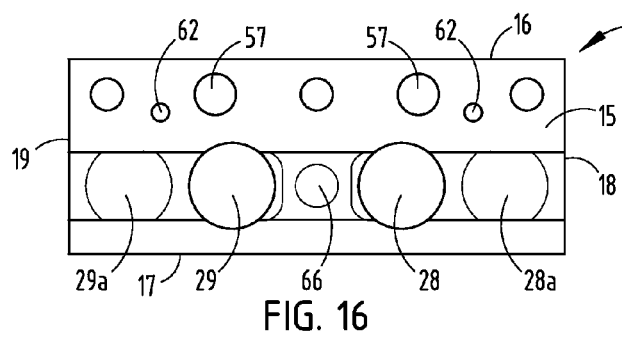
FIG. 16 is a bottom plan view of the universal base.
Figure 17:
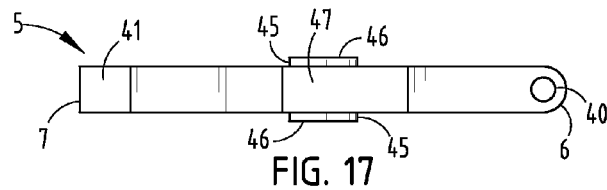
FIG. 17 is a top plan view of the short trigger arm shown in FIGS. 3-7.
Figure 18:
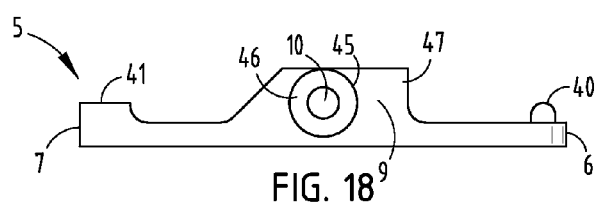
FIG. 18 is a side elevational view of the short trigger arm.
Figure 19:
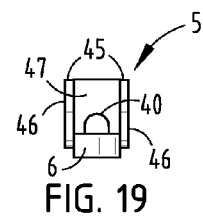
FIG. 19 is a right hand end elevational view of the short trigger arm.
Figure 20:
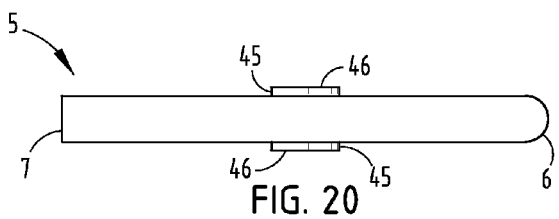
FIG. 20 is a bottom plan view of the short trigger arm.
Figure 21:
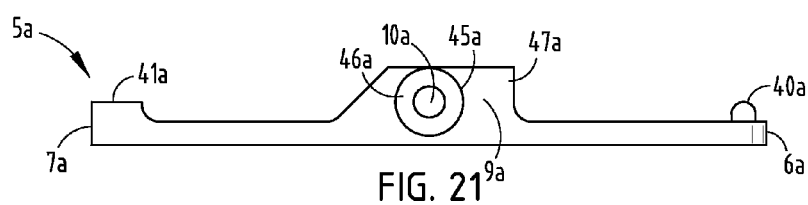
FIG. 21 is a side elevational view of the long trigger arm shown in FIGS. 2, 8 and 9.
Figure 22:
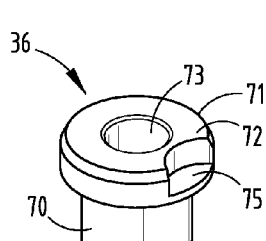
FIG. 22 is a perspective view of a gauge bushing portion of the trigger assembly.
Figure 23:
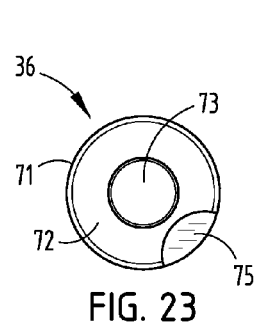
FIG. 23 is a top plan view of the gauge bushing.
Figure 24:
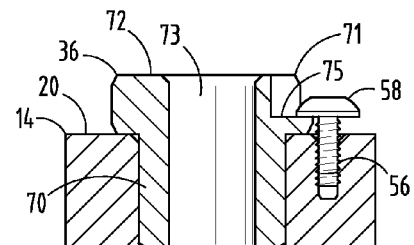
FIG. 24 is a cross-sectional view of the gauge bushing shown installed in the universal base.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1 and 2) generally designates a trigger assembly embodying the present invention. Trigger assembly 1 is particularly adapted for use in conjunction with parts checking jigs and the like, such as the custom made jig 2 illustrated in FIG. 1 which is configured to receive therein a formed sheet metal part or the like, such as a floor pan reinforcement member for motor vehicles (not shown). The sheet metal part is secured by clamps (not shown) in the custom made jig 2, which is configured in accordance with the design specifications of the sheet metal part. A plurality of trigger assemblies 1 are positioned at critical dimensional points around the jig 2.

In the illustrated example, trigger assembly 1 includes a pivoting trigger arm 5 having an outer end portion 6 configured for abutting contact with a part disposed in parts checking jig 2, an inner end portion 7 configured for abutting contact with a gauge 8 (FIGS. 6 and 7) that indicates the position of the formed part relative to the checking jig 2, and a central portion 9 of the laterally extending bearing aperture 10 about which trigger arm 5 pivots. The illustrated trigger assembly 1 also includes a universal base 14 having a lower face 15 configured for abutting support on an associated portion of the checking jig 2, opposite side faces 16 and 17, opposite end faces 18 and 19 and an upper face 20. First and second pairs of pivot pin apertures 24 and 25 are disposed in the side faces 16 and 17 of base 14, arranged in a longitudinally spaced apart relationship adjacent opposite end faces 18 and 19, and extend laterally through the side faces 16 and 17 for selective alignment with the bearing aperture 10 in trigger arm 5. A generally U-shaped channel 26 extends along the lower face 15 of base 14 and through end faces 18 and 19, and is configured to receive and retain therein trigger arm 5 for pivotal motion in the U-shaped channel 26. First and second gauge bushing apertures 28 and 29 are disposed in the upper face 20 of base 14 and arranged in a longitudinally spaced apart relationship adjacent the opposite end faces 18 and 19, and extend through the upper face 20 of base 14 into the U-shaped channel 26 at locations generally overlying the trigger arm 5 to facilitate the abutting contact between the gauge 8 and the inner end portion 7 of trigger arm 5. Trigger assembly 1 also includes a pivot pin 30 that is shaped for close reception in the bearing aperture 10 of trigger arm 5, and in both of the first and second pairs of pivot pin apertures 24 and 25 in base 14. Pivot pin 30 is selectively received in one of the first and second pairs of pivot pin apertures 24 and 25 and supports the trigger arm 1 in the U-shaped channel 26 of base 14 adjacent an associated one of the end faces 18 and 19 of the base 14 for pivoting motion between extended and retracted positions, as best shown in FIGS. 6 and 7. Trigger assembly 1 also includes a spring 32 having an inner end portion 33 supported in base 14 and an outer end portion 34 abuttingly contacting trigger arm 5 at a location thereon between bearing aperture 10 and inner end 7 to bias trigger arm 5 towards the extended position. Trigger assembly 1 also includes a gauge bushing 36 that is shaped for close reception in both of the first and second gauge bushing apertures 28 and 29 in base 14. Gauge bushing 36 is selectively received in one of the first and second gauge bushing apertures 28 and 29 for positioning the gauge 8 adjacent an associated one of the end faces 18 and 19 of base 14. Trigger arm assembly 1 can be readily configured for placement at various locations on the checking jig 2 by selective mounting of the trigger arm 5 using the pivot pin 30 in either one of the first and second pivot pin apertures 24 or 25, and selective mounting of the gauge bushing 36 in one of the first and second gauge bushing apertures 28 and 29.

As best illustrated in FIG. 2, the illustrated trigger assembly 1 is configured using one of two different length trigger arms 5 and 5a. Both trigger arms 5 and 5a have a substantially identical construction, except that trigger arm 5 is somewhat shorter than trigger arm 5a, and serves to adapt the trigger assembly 1 for use at different locations on the checking jig 2. For ease of description herein, similar parts of short trigger arm 5 and long trigger arm 5*a* are represented by the same reference numeral, except for the suffix "a" in the numerals of the latter. With reference to FIGS. 2 and 17-21, each trigger arm 5 and 5*a* has a generally rectangular plan configuration with the outer ends 6, 6*a* shaped arcuately. A feeler nub 40 protrudes upwardly from the outer end 6 of trigger arm 5, and has a generally spherical shape adapted to abut with a formed part positioned within checking jig 2. The inner end 7 of trigger arm 5 includes a raised flat face 41 that is adapted for abutting contact with the detector rod portion 42 of gauge 8, as shown in FIGS. 6 and 7. When the nub 40 on the outer end 6 of trigger arm 5 is engaged by a formed part placed within checking jig 2, trigger arm 5 rotates in a clockwise direction, as oriented in FIGS. 6 and 7, against the biasing force of spring 32, bringing the abutment face 41 on the inner end 7 of trigger arm 5 into contact with the rod 42 of gauge 8, so that the gauge 8 registers the movement on an associated dial 43. The central portion 9 of trigger arm 5 has an integrally formed bushing portion 45 having a generally cylindrical shape with annular side faces 46 that are closely received within the U-shaped channel 26 of base 14 to ensure accurate pivotal motion of trigger arm 5 relative to base 14. The bushing portion 45 of trigger arm 5 is formed in a raised center area 47 of trigger arm 5. In the illustrated example, trigger arm 5 has a one-piece integral construction from a rigid material, such as metal or the like.

As best illustrated in FIGS. 3-7, the illustrated universal base 14 has a generally rectangular block shape with the U-shaped channel 26 oriented generally downwardly and opening through the lower face 15. When either one of the trigger arms 5, 5*a* is assembled into the U-shaped channel 26 of base 14, the outer end 6 of the trigger arm protrudes outwardly from the end face 18 of base 14, and the inner end portion 7 of trigger arm 5, 5*a* is disposed wholly within the U-shaped channel 26. The pivot pin apertures 24, 25 are positioned in universal base 14 such that the short trigger arms 5 can be mounted in universal base 14 with the outer end 6 protruding outwardly from either the end face 18 of base 14 or the end face 19 of base 14, so as to define both right-handed and left-handed embodiments of the trigger assembly, as shown in FIG. 1. Similarly, the long trigger arms 5*a* can be mounted in universal base 14 using either pair of pivot pin apertures 24, 25 to define both right-handed and left-handed embodiments of the trigger assembly 1. The illustrated base 14 also includes two pairs of gauge bushing apertures 28, 28*a* and 29, 29*a* disposed adjacent the opposite end faces 18 and 19 of base 14. Each of the gauge bushing apertures 28, 28*a* and 29, 29*a* has a substantially identical construction, and is shaped to closely receive and retain therein the gauge bushing 36. When trigger assembly 1 is fabricated using a short trigger arm 5, gauge bushing 36 is mounted in either gauge bushing aperture 28 or 29, depending upon whether a right-handed or left-handed version is desired. When trigger assembly 1 is fabricated using a long trigger arm 5*a*, gauge bushing 36 is mounted in either gauge bushing aperture 28*a* or 29*a*, depending upon whether a right-handed or left-handed version is desired.

In the illustrated example (FIGS. 2 and 10-16), two threaded retention apertures 56 are disposed in the upper face 20 of base 14 at locations centrally between each pair of gauge bushing apertures 28, 28*a* and 29, 29*a* and are adapted to receive a retention fastener 58 therein, which abuttingly contacts the gauge bushing 36 to securely, yet detachably, retain the gauge bushing 36 in base 14. The illustrated base 14 also includes five fastener apertures 57 that extend through the upper and lower faces 20, 15 of base 4, and serve to facilitate mounting the base 14 to the checking jig 2 using fasteners, such as cap screws 59, or the like.

Figure 25:
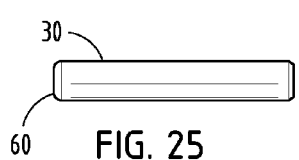
FIG. 25 is a side elevational view of a pivot pin portion of the trigger assembly.
Figure 26:
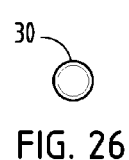
FIG. 26 is an end elevational view of the pivot pin.
Figure 27:
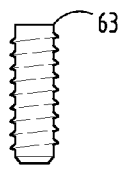
FIG. 27 is a side elevational view of a set screw portion of the trigger assembly.
Figure 28:
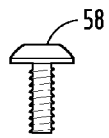
FIG. 28 is a side elevational view of a retention fastener portion of the trigger assembly.
Figure 29:
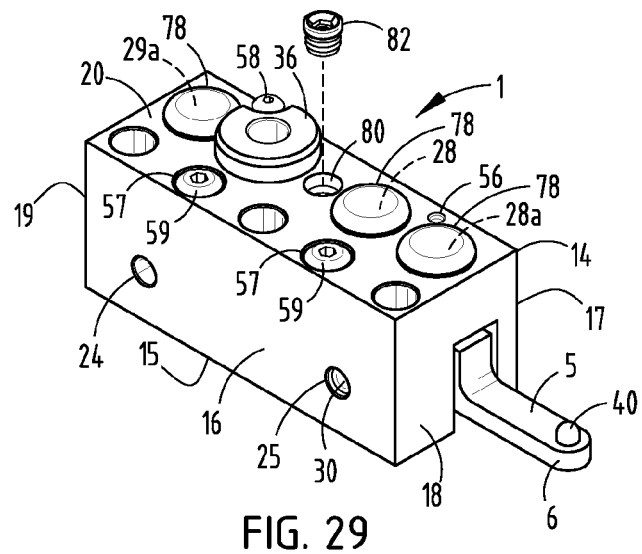
FIG. 29 is a top perspective view of another embodiment of the present invention showing a set screw portion thereof exploded away from the trigger assembly.

The illustrated pivot pin 30 (FIGS. 2, 25 and 26) has a rigid construction formed from steel or the like, with a generally cylindrical shape and champered outer ends 60 which facilitate insertion of the pivot pin into the pivot pin apertures 24 and 25. Preferably, pivot pin 30 has an outside diameter that is slightly smaller than the inside diameter of pivot pin apertures 24 and 25, such that pivot pin 30 can be inserted by hand into the pivot pin apertures 24 and 25. In this manner, pivot pin 30 can be detachably retained in the first and second pairs of pivot pin apertures 24 and 25 to permit the pivot pin 30 to be readily removed and replaced to alter the location of the trigger arms 5, 5*a* in base 14. As described in greater detail hereinafter, in the illustrated example, two threaded apertures 62 (FIGS. 3 and 16) are disposed in the lower face 15 of base 14 and open into and are aligned with the pivot pin apertures 24 and 25. A threaded set screw 63 (FIGS. 2 and 27) is threaded into the aperture 62 in which the pivot pin 30 is placed, so as to securely retain the pivot pin 30 in place in base 14, although permitting pivot pin 30 to be easily removed.

The illustrated spring 42 (FIGS. 2 and 6-9) comprises a coil spring, with the inner end 33 mounted in an interior socket or blind hold 66 in the interior of base 14, as best illustrated in FIGS. 4, 6-9 and 16. The outer end of coil spring 32 abuts the trigger arm 5*a*, 5*b* at a location disposed substantially centrally between the flat face 41 on the outer end 6 of trigger arm 5 and the bearing aperture 10 on trigger arm 5. The force of coil spring 32 applied to the inner end 7 of trigger arm 5 causes trigger arm 5 to be biased towards the normally extended position shown in FIGS. 6 and 8.

The illustrated gauge bushing 36 (FIGS. 1, 2 and 22-24) has a generally cylindrical shape with an inner sleeve portion 70 shaped for close reception in any one of the gauge bushing apertures 28, 28*a* and 29, 29*a* and an enlarged head portion 71 having a lower surface which abuts the upper face 20 of base 14 to properly locate the gauge bushing 36 in base 14. The upper surface 72 of the head portion 71 of gauge bushing 36 is generally flat, and the central aperture 72 is shaped to receive the detector rod portion 42 of the gauge 8 therein. In the illustrated example, the upper surface 72 of the gauge bushing 36 includes a generally flat, arcuately shaped, cut out land portion 75 disposed adjacent to the marginal edge thereof, which is engaged by the head of retention fastener 58 to securely, yet detachably, retain the gauge bushing 36 in one of the gauge bushing apertures 28, 28*a* and 29, 29*a* of base 14.

Trigger assembly 1 can be readily reconfigured to facilitate positioning the same at various locations within the checking jig 2 in the following manner. As noted above, each of the trigger arms 5 and 5*a* can be mounted in either pair of pivot pin apertures 24 and 25, such that the outer ends 6, 6*a* of the trigger arms 5, 5*a* can protrude outwardly from either of the end faces 18 and 19 of universal base 14, thereby fabricating either right-handed or left-handed embodiments of the trigger assembly 1, as shown in FIG. 1. Furthermore, the universal base 14 is configured to accept a variety of different trigger arm lengths, such as the illustrated short trigger arm 5 and 5*a*, FIGS. 2 and 6-9, which permits the nubs 40, 40*a* on the outer ends 6, 6*a* of the trigger arms 5, 5*a* to be placed at the critical dimension points around the jig 2. When the short trigger arm 5 is used, gauge bushing 36 is positioned in one of the interior gauge bushing apertures 28 and 29, depending on whether the configuration is for a left hand or right hand embodiment. When the long trigger arm 5*a* is used, the gauge bushing 36 is positioned in one of the two outer gauge bushing apertures 28*a* and 29*a*, depending whether the trigger assembly is configured for left hand or right hand applications. Plugs or dust covers 78 (FIGS. 1 and 2) are provided for insertion into the empty gauge bushing aperture 28, 28a, 29, 29a in base 14 to close the same off, and prevent debris from entering the interior of trigger assembly 1. Consequently, trigger assembly 1 can be easily adapted to permit positioning the same at different locations in the checking jig 2, thereby minimizing production and inventory costs.

Figure 30:
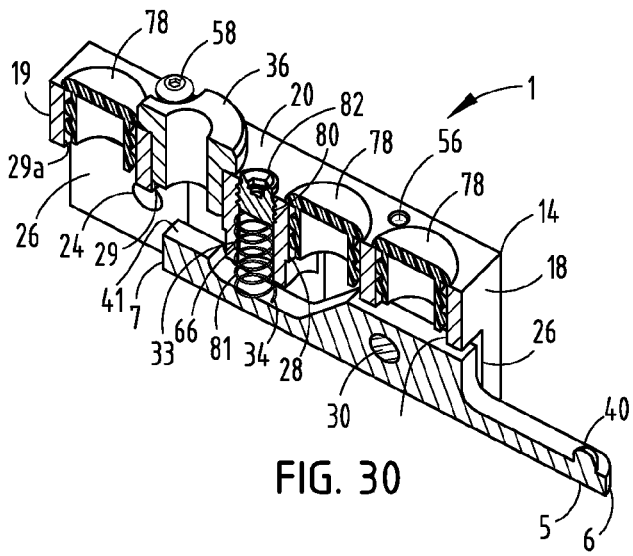
FIG. 30 is a longitudinal cross-sectional view of the alternative trigger assembly shown in FIG. 29.
Figure 31:
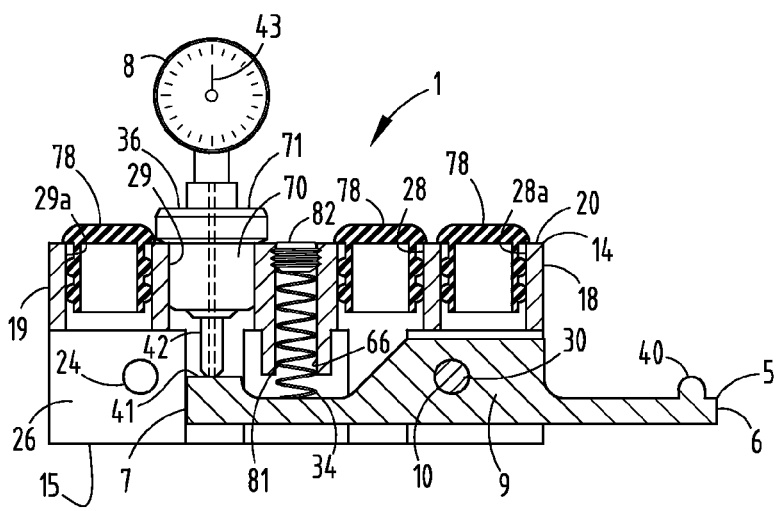
FIG. 31 is a longitudinal cross-sectional view of the alternative trigger assembly shown in FIGS. 29 and 30 with a gauge mounted therein, shown in an extended position.

The reference numeral 1b generally designates another embodiment of the present invention, having an adjustable spring tensioning assembly for the trigger arm. Since trigger assembly 1b is similar to the previously described trigger assembly 1, similar parts appearing in FIGS. 1-28 and 30-31 are represented by the same, corresponding reference numerals, except for the suffix "b" in the numerals of the latter. In trigger assembly 1b, base 14 includes a threaded aperture 80 disposed in the upper surface 20b at a location centrally between gauge bushing apertures 28b and 29b. Threaded aperture 80 is aligned with and opens into blind hole 66b in base 14b. An elongate coil spring 81, which is longer than that of the spring 32 in trigger assembly 1 has its outer end 34b abuttingly supported on trigger arm 5b, and its upper end extending into threaded aperture 80. A threaded set screw 82 is shaped for threaded reception in the threaded aperture 80 in base 14b, and contacts the inner end 33b of spring 81 in the manner illustrated in FIGS. 30 and 31. Rotation of set screw 82 relative to base 14 adjusts the tension of spring 81 and the resultant biasing force applied to trigger arm 5b.

The foregoing description will be readily appreciated by those skilled in the art. Modifications may be made to the invention without departing from the concepts disclosed herein. Such modifications are to be considered as included in the following claims, unless these claims by their language expressly state otherwise.

The invention claimed is:

1. A trigger assembly for parts checking jigs and the like, comprising:
   a pivoting trigger arm having an outer end portion configured for abutting contact with a formed part disposed in an associated checking jig, an inner end portion configured for abutting contact with a gauge that indicates the position of the formed part relative to the checking jig, and a central portion with a laterally extending bearing aperture about which said trigger arm pivots;
   a universal base having a lower face configured for abutting support on an associated portion of the checking jig, opposite side faces, opposite end faces and an upper face disposed generally parallel with and opposite said lower face, and including:
   first and second pivot pin apertures disposed in said side faces and arranged in a longitudinally spaced apart relationship adjacent said opposite end faces, and extending laterally through said side faces for selective alignment with said bearing aperture in said trigger arm;
   a generally U-shaped channel extending along said lower face and through said end faces, and configured to receive and retain said trigger arm for pivotal motion in said U-shaped channel;
   first and second gauge bushing apertures disposed in said upper face and arranged in a longitudinally spaced apart relationship adjacent said opposite end faces, and extending through said upper face and into said U-shaped channel at locations generally overlying said trigger arm to facilitate said abutting contact between the gauge and said inner end portion of said trigger arm;
   a pivot pin shaped for close reception in said bearing aperture of said trigger arm and both of said first and second pivot pin apertures in said base;
   said pivot pin being selectively received in one of said first and second pivot arm apertures and supporting said trigger arm in said U-shaped channel of said base adjacent an associated one of said end faces of said base for pivoting motion between extended and retracted positions;
   a spring having an inner end portion supported in said base, and an outer end portion abuttingly contacting said trigger arm at a location thereon between said bearing aperture and said inner end portion to bias said trigger arm towards said extended position;
   a gauge bushing shaped for close reception in both of said first and second gauge bushing apertures in said base;
   said gauge bushing being selectively received in one of said first and second gauge bushing apertures for positioning the gauge adjacent an associated one of said end faces of said base, whereby said trigger arm assembly can be readily reconfigured for placement at various location on the checking jig by selective mounting of said trigger arm using said pivot pin in either one of said first and second pivot pin apertures, and selective mounting of said gauge bushing in either one of said first and second gauge bushing apertures.

2. A trigger assembly as set forth in claim 1, wherein:
   said pivot pin is detachably retained in said first and second pivot pin apertures to permit said pivot pin to be readily removed and replaced in said first and second pivot pin apertures to alter the location of said trigger arm in said base.

3. A trigger assembly as set forth in claim 2, wherein:
   said gauge bushing is detachably retained in said first and second gauge bushing apertures to permit said gauge bushing to be readily removed and replaced in said first and second gauge pin apertures to alter the location of the gauge in said base.

4. A trigger assembly as set forth in claim 3, wherein:
   said trigger arm defines a first trigger arm having a first predetermined length; and including
   a second trigger arm configured substantially similar to said first trigger arm, and having a second predetermined length which is greater than said first predetermined length of said first trigger arm.

5. A trigger arm assembly as set forth in claim 4, wherein:
   said U-shaped channel in said base is shaped to receive and pivotally retain therein both said first trigger arm and said second trigger arm to selectively vary the location of said abutting contact with the formed part.

6. A trigger arm assembly as set forth in claim 5, wherein:
   said base is generally block shaped, such that when said pivot pin is mounted in said first pivot pin aperture, said outer end portion of said one of said first and second pivot arms protrudes outwardly from a first one of said end faces of said base, and said inner end portion of said one of said first and second trigger arms is disposed wholly in said U-shaped channel to define a right hand trigger configuration.

7. A trigger arm assembly as set forth in claim 5, wherein:
   said base is generally block shaped, such that when said pivot pin is mounted in said second pivot pin aperture, said outer end portion of said one of said first and second pivot arms protrudes outwardly from a second one of said end faces of said base, and said inner end portion of said one of said first and second trigger arms is disposed wholly in said U-shaped channel to define a left-hand trigger configuration.

8. A trigger assembly as set forth in claim 5, including:
a removable set screw mounted in said base and having an end abuttingly contacting said pivot pin to securely, yet detachably retain said pivot pin in said base.

9. A trigger assembly as set forth in claim 8, including:
a retention fastener removably mounted in said base and having an engagement portion abuttingly contacting said gauge bushing to securely, yet detachably retain said gauge bushing in said base.

10. A trigger assembly as set forth in claim 9, including:
a fastener aperture extending through said upper and lower faces of said base for mounting said base to the checking jig.

11. A trigger assembly as set forth in claim 10, including:
a fastener disposed in said fastener aperture of said base, and having an outer end configured for anchoring in the checking jig.

12. A trigger assembly as set forth in claim 11, wherein:
said lower face of said base includes two threaded set screw apertures extending toward said upper face, aligned with and opening into said first and second pivot pin apertures, and configured to threadedly receive said set screw therein to securely, yet detachably retain said pivot pin in said base.

13. A trigger assembly as set forth in claim 12, wherein:
said gauge bushing includes a generally flat land disposed adjacent a marginal edge thereof which abuts with said retention fastener to securely, yet detachably retain said gauge bushing in said base.

14. A trigger assembly as set forth in claim 13, wherein:
said upper face of said base includes two threaded retention screw apertures extending toward said lower face, located adjacent to said first and second gauge bushing apertures, and configured to threadedly receive said retaining fastener therein to securely yet detachable retain said gauge bushing in said base.

15. A trigger assembly as set forth in claim 14, including:
third and fourth gauge bushing apertures disposed in said upper face of said base and arranged in a longitudinally spaced apart relationship to define adjacent pairs with said first and second gauge bushing apertures, and having a substantially similar shape thereto which extends through said upper face of said base and into said U-shaped channel at locations generally overlying said trigger arm to facilitate said abutting contact between the gauge and said inner end portion of said trigger arm.

16. A trigger assembly as set forth in claim 15, wherein:
said two threaded retention fastener apertures in said upper face are disposed in between said first and third and said second and fourth pairs of gauge bushing apertures, and configured to threadedly receive said retainer fastener therein to securely, yet detachably retain said gauge bushing in said base.

17. A trigger assembly as set forth in claim 16, including:
a plurality of dust covers shaped for insertion into those of said gauge bushing apertures not occupied by said gauge bushing.

18. A trigger assembly as set forth in claim 17, including:
a threaded spring screw threaded mounted in said upper face of said base and having an interior end portion thereof abutting said inner end portion of said spring, whereby axial rotation of said spring screw relative to said base varies the biasing force said spring applies to said trigger arm.

\* \* \* \* \*